(12) United States Patent
Zhang et al.

(10) Patent No.: US 9,117,279 B2
(45) Date of Patent: Aug. 25, 2015

(54) HAIR SURFACE RECONSTRUCTION FROM WIDE-BASELINE CAMERA ARRAYS

(71) Applicant: Microsoft Corporation, Redmond, WA (US)

(72) Inventors: Zhengyou Zhang, Bellevue, WA (US); Cha Zhang, Sammamish, WA (US); Linjie Luo, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 13/802,541

(22) Filed: Mar. 13, 2013

(65) Prior Publication Data

US 2014/0267225 A1 Sep. 18, 2014

(51) Int. Cl.
*G06T 17/00* (2006.01)
*G06T 7/00* (2006.01)

(52) U.S. Cl.
CPC ............. *G06T 7/0067* (2013.01); *G06T 7/0085* (2013.01); *G06T 17/00* (2013.01); *G06T 2200/08* (2013.01)

(58) Field of Classification Search
None
See application file for complete search history.

(56) References Cited

U.S. PATENT DOCUMENTS

2003/0184544 A1* 10/2003 Prudent .......................... 345/419
2012/0313937 A1 12/2012 Beeler et al.

OTHER PUBLICATIONS

Chai et al., "Single-View Hair Modeling for Portrait Manipulation," ACM, Jul. 2012.*
Yamaguchi et al., "Video-Based Modeling of Dynamic Hair," pp. 585-596, 2009, Springer.*
Bertails et al., "Predicting Natural Hair Shapes by Solving the Statistics of Flexible Rods", Eurographics, 2005.*
Luo, et al., "Multi-View Hair Capture using Orientation Fields", In Proceedings of the IEEE Conference on Computer Vision and Pattern Recognition, Jun. 16-21, 2012, 8 pages.
Wei, et al., "Modeling Hair from Multiple Views", In Journal of ACM Transactions on Graphics, vol. 24, Issue 3, Jul. 2005, 5 pages.
Paris, et al., "Hair Photobooth: Geometric and Photometric Acquisition of Real Hairstyles", In Journal of ACM Transactions on Graphics, vol. 27, Issue 3, Article 30, Aug. 2008, 9 pages.
Luo, et al., "Dynamic Hair Capture", In Technical Report TR-907-11, Princeton University, Aug. 2011, 10 pages.
Choe, et al., "A Statistical Wisp Model and Pseudophysical Approaches for Interactive Hairstyle Generation", In Proceedings of IEEE Transactions on Visualization and Computer Graphics, vol. 11, Issue 2, Mar. 2005, pp. 160-170.
Kim, et al., "A Thin Shell Volume for Modeling Human Hair", In Proceedings of the Computer Animation, May 3, 2000, 14 pages.
"International Search Report & Written Opinion for PCT Patent Application No. PCT/US2014/021406", Mailed Date: Jun. 23, 2014, Filed Date: Mar. 6, 2014, 14 pages.

(Continued)

*Primary Examiner* — Kee M Tung
*Assistant Examiner* — Nicholas R Wilson
(74) *Attorney, Agent, or Firm* — Judy Yee; Micky Minhas (57) ABSTRACT

The subject disclosure is directed towards reconstructing an approximate hair surface using refinement of hair strands. Hair strands are first extracted from 2D images of a camera array, and projected onto a 3D visual hull. The 3D positions of these strands are refined by optimizing an objective function that takes into account orientation consistency, a visual hull constraint and/or smoothness constraints defined at the strand, wisp and/or global levels.

20 Claims, 5 Drawing Sheets

(56) References Cited

OTHER PUBLICATIONS

Landabaso, et al., "Shape From Inconsistent Silhouette for Free Viewpoint Video", In 15th IEEE International Conference on Image Processing, Oct. 12, 2008, pp. 213-216.

Shu, et al., "Hardware-Based Camera Calibration and 3D Modelling Under Circular Motion", In IEEE Computer Society Conference on Computer Vision and Pattern Recognition Workshops, Jun. 23, 2008, 6 pages.

* cited by examiner

HAIR SURFACE RECONSTRUCTION FROM WIDE-BASELINE CAMERA ARRAYS

BACKGROUND

Applications such as immersive telecommunication, games, tele-presence and those providing virtual three-dimensional (3D) environments with realistic motion parallax need a reasonably faithful reconstruction of the human subject. Multi-view stereo cameras have been widely used to reconstruct various real world objects, including human subjects for such applications. However, reconstruction of hair (e.g., human hair) remains a challenging task due to the many distinct characteristics of hair. For instance, omnipresent occlusions and complex strand geometry preclude general surface-based smoothness priors for hair reconstruction. The highly specular nature of hair also violates the Lambertian surface assumption employed in most multi-view stereo methods.

As a result, many practical systems have either completely avoided hair reconstruction during facial capture, or relied on manual input to achieve plausible results. Attempts to facilitate hair capture using specialized hardware, such as a fixed camera with moving light sources, a stage-mounted camera with macro lens, thermal imaging and so forth have been made. However, these mechanisms are generally costly, and require lengthy capture sessions that limit their applicability to hair that only stays static over time.

An alternative approach is to deploy dense camera arrays that have small baselines, e.g., separated by angles on the order of fifteen degrees or so depending on the number of cameras. That is, to capture complete full-head hairstyles, it is typical to have twenty to thirty camera views. Due to the complex hardware setup, it is challenging to adopt this many cameras in real-world systems and applications.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards processing a plurality of images obtained from a wide baseline camera array into output rendering data that includes reconstructed hair data. Strand data is extracted from the images, and the strand data is refined, including by optimizing projected orientation consistency using one or more constraints.

In one aspect, a processing pipeline receives a plurality of images from a camera array, and processes the images into a visual hull and per-camera orientation maps. The pipeline extracts strands from the orientation maps, projects the strands onto the visual hull, and refines the strands into a reconstructed hair surface using an objective function optimized under one or more constraints. Data corresponding to the reconstructed hair surface is output, e.g., for image rendering.

An aspect is directed towards reconstructing an approximate hair surface, including extracting hair strand data from a plurality of two-dimensional views, projecting the hair strand data onto a three-dimensional visual hull, and refining the three-dimensional positions of the hair strand data. The refining includes optimizing an objective function based upon minimizing a total energy including an orientation energy, a silhouette energy and/or a smoothness energy Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards reconstructing hair surface from a wide-baseline camera array. To this end, one implementation provides an optimization framework, e.g., in the form of a pipeline, that imposes multiple constraints for hair surface reconstruction. The optimization may be performed on samples of hair strands in 3D directly (instead of from the captured 2D image views).

Constraints may include a hair orientation constraint, in which the orientation strand of hair from different views is consistent, and a silhouette constraint in which the hair surface needs to be inside or near (not be significantly larger than) a visual hull. A color constraint may provide that the color from different views is at least somewhat consistent. A smoothness constraint specifies that hair strands are smooth; the smoothness may be at different levels as described herein. In one implementation, the framework derives the hair surface from a combination of the constraints.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and camera-based reconstruction in general.

Figure 1:
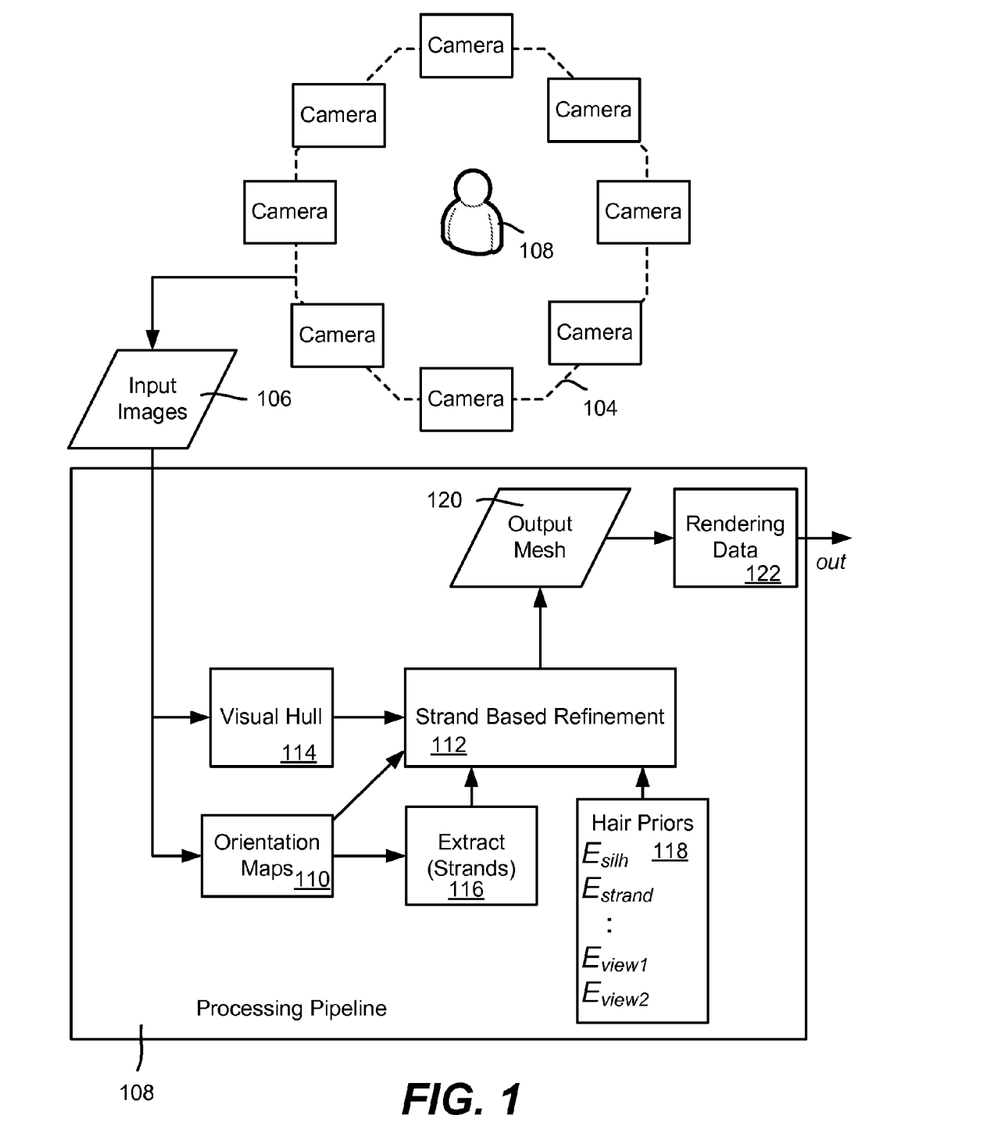
FIG. 1 is a block diagram including components of a processing pipeline that reconstructs hair surfaces using strand-based refinement, according to one example embodiment.

FIG. 1 is a block diagram showing example components of an example framework in the form of a processing pipeline 102 used in one implementation. In general, an array 104 of cameras (denoted via the dashed octagon) feeds a plurality of input images 106 of a subject 108 to the processing pipeline 102. In one implementation, eight cameras are used, e.g., operating at 600×800 pixel resolution and 30 frames per second, with each adjacent pair of cameras having a large forty-five degree wide angular baseline with the array. Other camera arrangements, including different numbers of cameras may be used. Depth cameras also may be used to provide depth information. Note that while one subject exemplified, more than one subject may be captured in the images, with hair surface reconstruction (as described below) performed for each subject.

Described herein is an example mechanism (algorithm) that matches the projected orientation of three-dimensional (3D) hair strands against the orientation maps 110 of the views in which they are visible. In general, the hairs are extracted from the 2D images, projected onto a visual hull representing the human subject, and then refined as described herein. To this end, the 3D strands are first generated separately from a two-dimensional (2D) strand extraction operation in each view, and then jointly optimized in a strand-based refinement operation 112. Note that with the array shown above, matching only small neighborhoods across views, as done in existing methods, is unreliable and error-prone.

To this end, in the processing pipeline 102, a plurality of input images 106 are taken from the different views and the orientation maps 110 computed, one for each image. Using a visual hull 114 constructed from the segmented images, strands on the orientation maps are extracted (block 116), and projected from each view onto the visual hull 114 as part of strand initialization. Strand-based refinement 112, using constraints (e.g., priors 118) is performed to obtain final strand positions. The hair surface is able to be reconstructed (e.g., merged with a facial reconstruction) from the refined strands using a known Poisson surface reconstruction technique, for example. This is represented in FIG. 1 via the output mesh 120 and rendering data 122.

In one aspect, given a set of wide-baseline images 106, the framework operates to compute a shape that suitably approximates the captured hair volume. This is achieved by refining the positions of a dense set of representative 3D hair strands derived from each camera view. To create the initial 3D strands for refinement, a hair orientation map is computed for each input image, and 2D strands extracted by tracking the confident ridges on the orientation map, (as generally described by M. Chai, L. Wang, Y. Weng, Y. Yu, B. Guo, and K. Zhou, in *Single-view hair modeling for portrait manipulation*, ACM Trans. Graph., 31(4):116:1-116:8, July 2012.). The 2D strands are then back-projected onto the visual hull constructed from the segmented foreground of the input images to form the initial 3D strands.

An iterative strand refinement algorithm (shown in FIG. 1 as strand-based refinement 112, described below) is applied to optimize the orientation consistency of the projected strands on the orientation maps. For example, the 3D positions of these strands may be refined by optimizing an objective function that takes into account cross-view hair orientation consistency, the visual hull constraint and smoothness constraints defined at strand, wisp and global levels. In one implementation, the framework regularizes the optimization with the silhouette constraint, along with a set of smoothness priors for hair. As set forth above, a final hair shape may be obtained using a known Poisson surface reconstruction technique from the refined 3D strands, for example.

With respect to strand initialization, the framework computes an orientation map for each image using a known technique in which a bank of rotated filters is used to detect the dominant orientation at each pixel. The orientation map is enhanced with three passes of iterative refinement to improve the signal-to-noise ratio. To further reduce noises in regions with low confidence, a known bilateral filtering method may be used to diffuse the orientations of the high confidence region. The confidence ridges of each orientation map are tracked using hysteresis thresholding. The result is a set of poly-line 2D strands comprising densely sampled vertices in about one-pixel steps. Each vertex of the resulting 2D strands is back-projected onto the visual hull to determine the initial position of the 3D strands. Note that the 3D strands are generally over-sampled after back-projection from 2D strands. For example, each 3D strand is down-sampled by uniformly decimating the vertices to twenty percent of the original vertex count in order to reduce the subsequent computation cost.

After initializing the 3D strands from the 2D strands in each reference view (the view from which the strands were extracted), the strands are iteratively refined by optimizing the projected orientation consistency across the visible views with silhouette and smoothness constraints. The strand thus may be the basic unit that drives the refinement process.

The optimization may be formulated as an energy minimization problem. Minimizing the energy provides a set of refined strands; the rough geometry is deformed according to the refined strand positions. The total energy is defined as the weighted sum of a number of energies, such as orientation energy, silhouette energy and smoothness energy:

$$E = \sum_\star \alpha_\star E_\star$$

where $\star$ denotes each specific energy term as described below. Note that other energies, such as color energy, are also feasible to use. The energy terms are formulated in squared forms so that the total energy may be minimized with efficient non-linear solvers such as Levenberg-Marquardt.

Turning to additional details, let p denote a strand vertex on a 3D strand S. Subscripts reference its successor $p_{+1}$ and predecessor on S. Similarly, $p_{+0.5}$ is defined as the middle point between p and $p_{+1}$. The strand direction d(p) at p is defined as $p_{+1} - p_{-1}$. The reference view of p is denoted as R(p) and the visibility of p defines the set of views where p is visible. Because strand visibility is difficult to define exactly during strand refinement, V(p) is approximated by the visibility of its closest point h(p) on the visual hull H during the refinement. It is seen that p's reference view R(p)∈V(p).

Figure 2A:
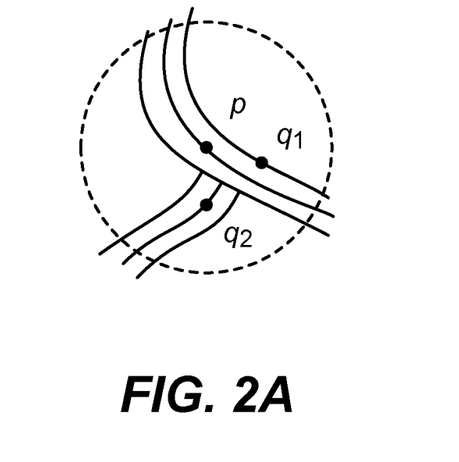
FIGS. 2A and 2B are representations of a same-view neighborhood and a different-view neighborhood, respectively, with respect to hair strands, according to one example embodiment.
Figure 2B:
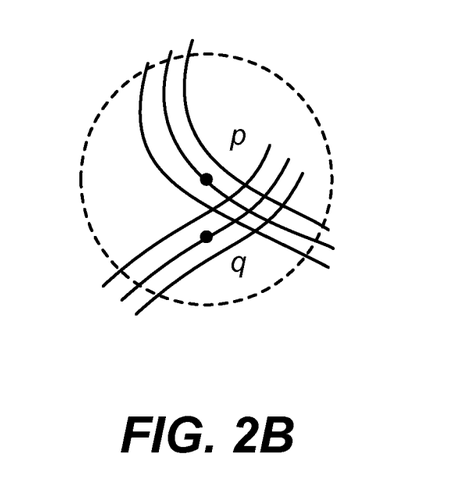

Two different neighborhoods are defined for vertex p, namely the same-view neighborhood $N^+(p)$ and the different-view neighborhood $N^-(p)$, as shown in FIGS. 2A and 2B, which illustrate the same-view neighborhood $N^+(p)$ and different-view neighborhood $N^-(p)$ for p, respectively. The neighbors are searched within the radius ($2.5\sigma_e$) indicated by the dashed circles. The same-view neighbors $q_1$ and $q_2$ can be weighted differently by how their orientations differ from p's (FIG. 2A). The different-view neighbor q is located on the strands from a different reference view (FIG. 2B).

$N^+(p)$ is defined as the vertices with the same reference view as p and located within a certain 3D Euclidean distance from p. Vertices on the same strand as p are excluded from $N^+(p)$. $N^-(p)$ is defined similarly but the neighboring vertices are in different reference views.

Likewise, the algorithm defines the same-view weight $w^+(p, q)$ between two vertices p and q if $q \in N^+(p)$ and differ ent-view weight $w^-(p, q)$ if $q \in N^-(p)$. The different-view weight $w(p, q)$ is defined as the Gaussian weight:

$$w^-(p, q) = \exp\left(-\frac{\|p - q\|^2}{2\sigma_e^2}\right) \quad (2)$$

where $\sigma_e$ controls the influence radius around the strand vertices and is set to 0.05 of the diagonal length D of the visual hull's bounding box. The same-view weight $w^+(p, q)$ is a bilateral weight that takes into account the Euclidean distance and the orientation difference between p and q:

$$w^+(p, q) = \exp\left(-\frac{1 - \langle d(p), d(q)\rangle^2}{2\sigma_o^2} - \frac{\|p - q\|^2}{2\sigma_e^2}\right) \quad (3)$$

where $\sigma_o$ controls the influence between strand vertices with similar orientations and is set to 0.5 in one implementation. The notation $\langle A, B\rangle$ is defined as the cosine of the angle between two vectors A and B, that is, $\langle A, B\rangle \triangleq A \cdot B/(\|A\|\|B\|)$. This applies to both 3D and 2D cases. If either A or B is zero, $\langle A, B\rangle = 1$. Note that the normalized weights may be used for the neighbors. The normalized same-view weight $\overline{w}^+(p, q)$ and different-view weight $\overline{w}^-(p, q)$ are defined as:

$$\overline{w}^+(p, q) = \frac{w^+(p, q)}{\sum_{q \in N^+(p)} w^+(p, q)},$$

$$\overline{w}^-(p, q) = \frac{w^-(p, q)}{\sum_{q \in N^-(p)} w^-(p, q)}$$

A "surface" normal $n(p)$ is also defined at each strand vertex p, which can be computed by finding the eigenvector with the smallest eigenvalue of the covariance matrix $$\Sigma_{q \in N^+(p)} w^+(p,q)(q-p)(q-p)^T$$

The superscript $p^V$ is used to define the projected 2D point of p on one of the visible views $V \in (p)$. During the refinement, the position of p in 3D space is restricted along the ray shooting from the optical center of the reference view $R(p)$ to its projected point $p^{R(p)}$ on the reference view. This ensures that the vertex has the same projection on the reference view, and saves computation cost because of the reduced degrees-of-freedom.

The orientation energy $E_{orient}$ is designed to make sure that when a 3D strand is projected onto its visible views, its orientation is consistent with the orientation of hair indicated by the orientation maps of those views. Orientation energy measures the consistency between the projected orientation of each point on each strand and the input orientation field.

Figure 3A:
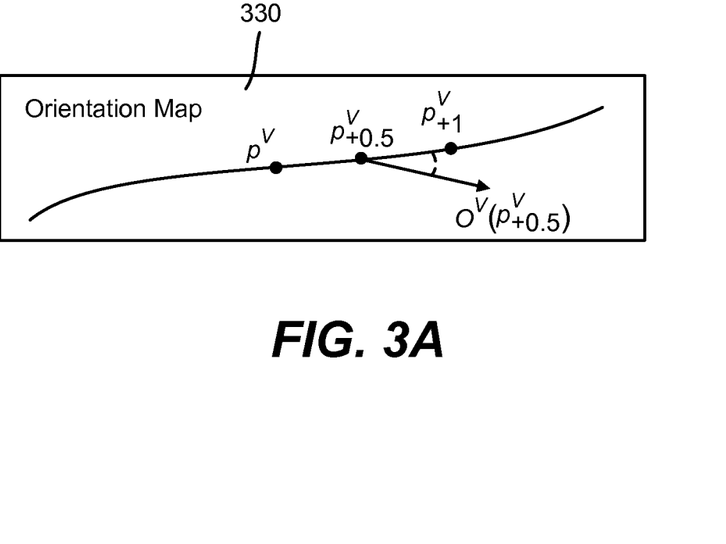
FIG. 3A is a representation of orientation energy of a projected strand, according to one example embodiment.

Once the framework applies the diffusion scheme described with respect to strand initialization to the orientation map $O^V$ of view V, an orientation vector $O^V(p^V)$ is defined at any point pV in the hair region, otherwise $O^V(p^V)$ is set to zero. The orientation energy is represented in FIG. 3A, in which a strand is projected on an orientation map 330; the orientation energy term $e_{orient}^V(pV)$ is determined by the angle between $O^V(p_{+0.5}^V)$ and $p_{+1}^V - p^V$.

An orientation energy term $e_{orient}^V(pV)$ is defined for each segment $(p, p_{+1})$ on S as follows:

$$e_{orient}^V(pV) = \min\{1 - \langle p_{+1}^V - p^V, O^V(p_{+0.5}^V)\rangle^2, T_{orient}\} \quad (4)$$

where $T_{orient} = 0.5$ is a threshold to make the energy robust to outliers with large projected orientation inconsistency. Note that the square in the definition makes it invariant to ±180° directional ambiguity.

The orientation energy $E_{orient}$ is defined as:

$$E_{orient} = \sum_p \sum_{V \in \nu(p)} w^V(p) e_{orient}^V(pV) \quad (5)$$

where $w^V(p) = \max(\langle n(p), v(p)\rangle, 0)$ is the visibility weight of p with respect to view V, and $v(p)$ is the direction from p to the optical center of view V.

Figure 3B:
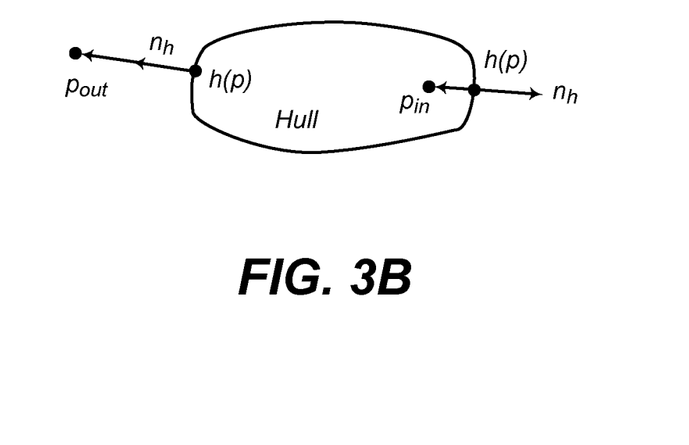
FIG. 3B is a representation of silhouette energy with respect to points on a visual hull, according to one example embodiment.

The 3D strands may be enforced to be within and near the visual hull using silhouette energy. FIG. 3B provides a representation of silhouette energy; the sign of $(p - h(p)) \cdot n_h$ determines if a point is inside the hull and thus the value of bin silhouette energy for $p_{in}$ and $p_{out}$. As illustrated in FIG. 3B, given p's closest point $h(p)$ on the hull and $h(p)$'s normal $n_h$, the silhouette energy $E_{silh}$ may be defined as:

$$E_{silh} = \frac{1}{D^2} \sum_p \beta((p - h(p)) \cdot n_h)^2 \quad (6)$$

where · represents inner product, and $\beta$ is used to discriminate the inside and outside cases for p with respect to the hull:

$$\beta = \begin{cases} 1 & (p - h(p)) \cdot n_h \leq 0 \\ w_{out} & (p - h(p)) \cdot n_h > 0 \end{cases} \quad (7)$$

where $w_{out}$ is a large penalty ($10^4$) against the case where the vertex is outside the visual hull. Note that the diagonal length D of the hull's bounding box may be used to make the energy unit-less. As similar approach may be applied for unit-less energy formulation.

In one implementation, smoothness energy is formulated at three different levels to help control the smoothness granularity, namely the strand level, the wisp level and the global level. The formulation for strand level smoothness $E_{strand}$ relates to the discrete elastic rod model often used in hair simulation that minimizes the squared curvature along hair strands. Further the orientation similarity in the bilateral same-view weight $w^+$ is taken into account so that the wisp smoothness energy $E_{wisp}$ can better adapt to the local wisp structures and hair's depth discontinuities. Also, the global smoothness energy $E_{global}$ ensures the global consistency of strand geometry across different views. Note that other smoothness energies may be used, e.g., intra-view smoothness and/or inter-view smoothness.

Strand smoothness energy may be defined as the summation of squared curvature for each vertex along all the strands:

$$E_{strand} = D^2 \sum_p curv^2(p) \quad (8)$$

where curvature is computed as:

$$curv(p) = \frac{2}{l_{+1} + l_{-1}} \left\| \frac{p_{+1} - p}{l_{+1}} - \frac{p - p_{-1}}{l_{-1}} \right\| \quad (9)$$

where $l_{+1} = \|p_{+1} - p\|$ and $l_{-1} = \|p - p_{-1}\|$.

Wisp smoothness energy may be used to enforce a strand vertex and its small same-view neighborhood $N^+(p)$ within the same wisp to lie on a local plane. The orientation similarity is used to estimate the likelihood of being in the same wisp and encode it in the same-view weight $w^+$. The wisp smoothness energy is thus defined as:

$$E_{wisp} = \frac{1}{D^2} \sum_p ((p - \sum_{q \in \tau_p} \overline{w}^+(p,q)q) \cdot n(p))^2 \quad (10)$$

The global smoothness energy is defined similarly to the wisp smoothness energy to enforce global refinement consistency through local planar resemblance across different views:

$$E_{global} = \frac{1}{D^2} \sum_p ((p - \sum_{q \in \tau_{p,v}} \overline{w}^-(p,q)q) \cdot n(p))^2 \quad (11)$$

Figure 4:
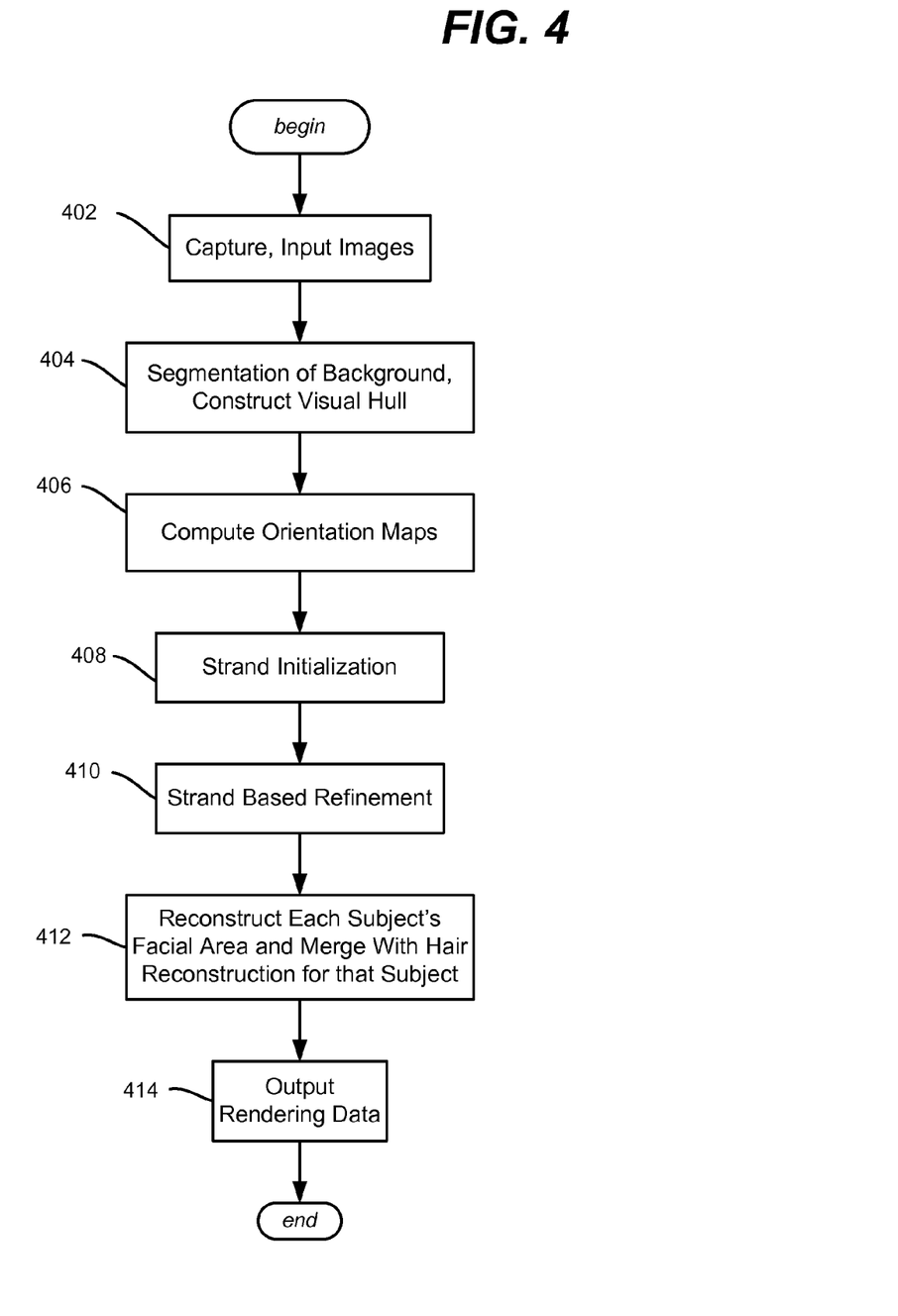
FIG. 4 is a flow diagram representing example steps for reconstructing a hair surface from an array of images, according to one example embodiment.

FIG. 4 is a flow diagram showing example steps, beginning at step 402 where a captured set of images for a synchronized "frame" is input into the pipeline. Step 404 processes the images to segment the background from the subject, and constructs the visual hull that is used as described herein. Note that segmentation, construction of a visual hull and orientation map computation may be based upon known techniques, and are not described in detail herein for purposes of brevity.

Step 406 computes the orientation maps, one for each image, which may be iteratively refined as described above. Note that computing the orientation maps is considered part of strand initialization (step 408). Strand initialization may include tracking the confidence ridges of each orientation map providing poly-line 2D strands of densely sampled vertices. Each vertex is backprojected onto the visual hull to determine the initial position of the 3D strands, which may be down-sampled as described above.

Step 410 represents the strand based refinement operation, which also may be iterative, to obtain the final strand positions used to reconstruct the approximate hair surface. As described above, refinement operates by optimizing the projected orientation consistency across the visible views with silhouette and smoothness constraints, and possibly one or more other (e.g., color) constraints.

At step 412 reconstructs each subject's facial area, e.g., using a known technique. The facial area is then merged with the hair reconstruction, e.g., using Poisson surface reconstruction. Step 414 outputs the rendering data, in any suitable format. The rendering data may be consumed by any application, such as a tele-presence application, a game, and so forth. The algorithm/pipeline may be reapplied as new images are captured, to output a series of frames over time, providing dynamic scenes.

Example Operating Environment

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
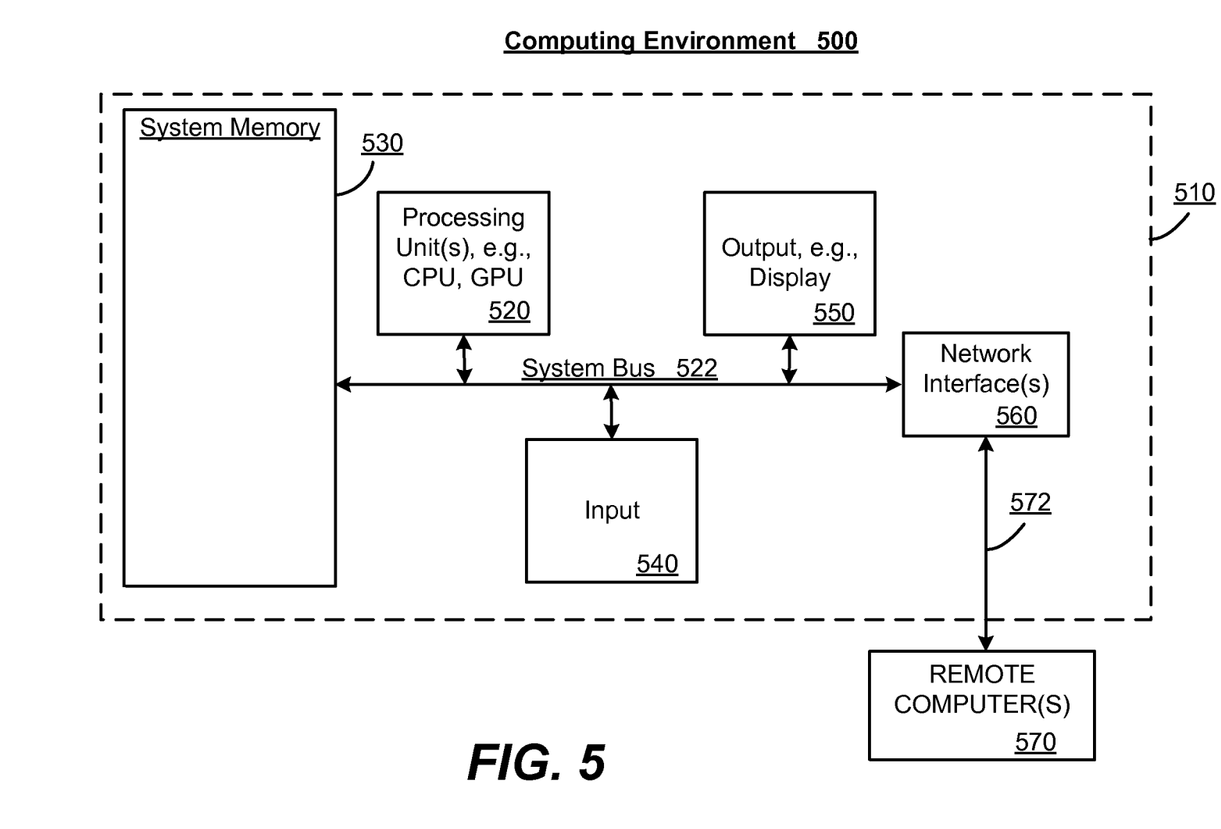
FIG. 5 is a block diagram representing an example computing environment, into which aspects of the subject matter described herein may be incorporated.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the example computing system environment 500.

With reference to FIG. 5, an example remote device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of computer readable media and can be any available media that can be accessed by computer 510. The system memory 530 may include computer storage media in the form of volatile and/or nonvolatile memory such as read only memory (ROM) and/or random access memory (RAM). By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method implemented at least in part on at least one processor, comprising, processing a plurality of images obtained from a wide baseline camera array into output rendering data that includes reconstructed hair data, including processing the images into per-camera orientation maps, extracting strand data from the orientation maps, projecting the strand data onto a visual hull, and refining the strand data including optimizing projected orientation consistency using one or more constraints.

2. The method of claim 1 wherein optimizing the projected orientation consistency comprises minimizing a total energy under the constraints.

3. The method of claim 1 wherein optimizing the projected orientation consistency comprises minimizing an optimization energy.

4. The method of claim 1 wherein optimizing the projected orientation consistency using the one or more constraints comprises using a silhouette constraint based upon a silhouette energy.

5. The method of claim 1 wherein optimizing the projected orientation consistency using the one or more constraints comprises using a smoothness constraint.

6. The method of claim 5 wherein using the smoothness constraint comprises computing a strand smoothness energy.

7. The method of claim 5 wherein using the smoothness constraint comprises computing a wisp smoothness energy.

8. The method of claim 5 wherein using the smoothness constraint comprises computing a global smoothness energy.

9. The method of claim 5 wherein using the smoothness constraint comprises computing a strand smoothness energy, a wisp smoothness energy and a global smoothness energy.

10. The method of 1 claim further comprising, using a result of refining the strand data to provide a hair reconstruction, and outputting rendering data corresponding to a merging of the hair reconstruction with a facial reconstruction.

11. A system comprising, one or more processors, a memory communicatively coupled to the one or more processors, and a processing pipeline configured to execute on the one or more processors from memory, the processing pipeline configured to receive a) a plurality of images from a camera array, b) process the images into a visual hull, c) process the images into per-camera orientation maps, d) extract strands from the orientation maps, e) project the strands onto the visual hull, f) refine the strands into a reconstructed hair surface using an objective function optimized under one or more constraints, and g) output data including data corresponding to the reconstructed hair surface.

12. The system of claim 11 wherein the objective function includes an orientation energy component.

13. The system of claim 11 wherein the one or more constraints include a constraint that enforces the strands to be within and near the visual hull.

14. The system of claim 11 wherein the one or more constraints include a smoothness constraint.

15. The system of claim 14 where the smoothness constraint corresponds to minimizing at least one of a strand smoothness energy, a wisp smoothness energy, or a global smoothness energy.

16. The system of claim 11 wherein the pipeline processes the images into per-camera orientation maps via an iterative process.

17. The system of claim 11 wherein the pipeline refines the strands into a reconstructed hair surface via an iterative process.

18. One or more computer storage media storing computer-executable instructions, which when executed on at least one processor perform steps, comprising, reconstructing an approximate hair surface, including extracting hair strand data from a plurality of two-dimensional views, projecting the hair strand data onto a three-dimensional visual hull, and refining the three-dimensional positions of the hair strand data, including optimizing an objective function based upon minimizing a total energy including at least one of: an orientation energy, a silhouette energy or a smoothness energy.

19. The one or more computer storage media of claim 18 wherein optimizing the objective function is based upon at least one of: cross-view hair orientation consistency, a visual hull constraint, or one or more smoothness constraints.

20. The one or more computer storage media of claim 18 wherein optimizing the objective function includes minimizing an energy including a smoothness energy under at least one of: a smoothness constraint at a strand level, a smoothness constraint at a wisp level or a smoothness constraint at a global level.

* * * * *